United States Patent
Huang et al.

(10) Patent No.: US 11,197,335 B2
(45) Date of Patent: Dec. 7, 2021

(54) METHOD FOR DATA TRANSMISSION AND RELATED PRODUCTS

(71) Applicant: GUANGDONG OPPO MOBILE TELECOMMUNICATIONS CORP., LTD., Guangdong (CN)

(72) Inventors: Yuan Huang, Guangdong (CN); Shixing Ke, Guangdong (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 81 days.

(21) Appl. No.: 16/786,963

(22) Filed: Feb. 10, 2020

(65) Prior Publication Data
US 2020/0260517 A1 Aug. 13, 2020

(30) Foreign Application Priority Data
Feb. 12, 2019 (CN) .......................... 201910111690.0

(51) Int. Cl.
*H04W 4/00* (2018.01)
*H04W 76/16* (2018.01)
(Continued)

(52) U.S. Cl.
CPC ............. *H04W 76/16* (2018.02); *H04W 4/80* (2018.02); *H04W 48/08* (2013.01); *H04W 48/16* (2013.01); *H04W 76/14* (2018.02); *H04W 88/06* (2013.01)

(58) Field of Classification Search
CPC ..... H04W 76/16; H04W 76/14; H04W 48/08; H04W 4/80; H04W 48/16; H04W 88/06; H04W 12/00; H04W 84/10
(Continued)

(56) References Cited

U.S. PATENT DOCUMENTS 8,315,623 B1 * 11/2012 Flynn .................... H04W 24/04
455/423
10,226,188 B2 * 3/2019 Watson ................ A61B 5/7221
(Continued)

FOREIGN PATENT DOCUMENTS

| CN | 202873086 | 4/2013 |
| CN | 104333888 | 2/2015 |

(Continued)

OTHER PUBLICATIONS

SIPO, Second Office Action for CN Application No. 201910111690.0, dated Jun. 28, 2020.
(Continued)

*Primary Examiner* — Marceau Milord
(74) *Attorney, Agent, or Firm* — Hodgson Russ LLP

(57) ABSTRACT

A method for data transmission and related products are provided. The method is applicable to an electronic device. A first wireless-fidelity (Wi-Fi) link and at least one second Wi-Fi link are established between the electronic device and at least one terminal. The first Wi-Fi link is operable in a station mode and each second Wi-Fi link is operable in a soft AP mode. The method includes the following. Data transmission is performed with the at least one terminal over the first Wi-Fi link and the at least one second Wi-Fi link simultaneously, where a transmission frequency band for data transmission over the first Wi-Fi link is different from a transmission frequency band for data transmission over each of any two links of the at least one second Wi-Fi link.

10 Claims, 2 Drawing Sheets

THE ELECTRONIC DEVICE PERFORMS DATA TRANSMISSION WITH THE AT LEAST ONE TERMINAL OVER THE FIRST WI-FI LINK AND THE AT LEAST ONE SECOND WI-FI LINK SIMULTANEOUSLY — 201

(51) Int. Cl.
*H04W 76/14* (2018.01)
*H04W 4/80* (2018.01)
*H04W 48/08* (2009.01)
*H04W 48/16* (2009.01)
*H04W 88/06* (2009.01)

(58) Field of Classification Search
USPC .................. 370/329, 252, 254, 338, 352
See application file for complete search history.

(56) References Cited

U.S. PATENT DOCUMENTS

| | | | |
|---|---|---|---|
| 10,849,053 B2* | 11/2020 | Li | H04W 76/10 |
| 2004/0199614 A1* | 10/2004 | Shenfield | H04L 29/06 |
| | | | 709/220 |
| 2004/0199648 A1* | 10/2004 | Shelest | H04L 63/0227 |
| | | | 709/229 |
| 2007/0129045 A1* | 6/2007 | Aerrabotu | H04W 52/0277 |
| | | | 455/343.5 |
| 2008/0009324 A1* | 1/2008 | Patel | H04B 17/318 |
| | | | 455/566 |
| 2009/0023426 A1* | 1/2009 | Shatzkamer | H04W 36/125 |
| | | | 455/414.1 |
| 2009/0156217 A1* | 6/2009 | Bajpai | H04W 36/14 |
| | | | 455/439 |
| 2010/0020707 A1 | 1/2010 | Woodings | |
| 2010/0110993 A1* | 5/2010 | Jain | H04W 88/06 |
| | | | 370/328 |
| 2010/0113001 A1* | 5/2010 | Tenbrook | H04W 4/02 |
| | | | 455/422.1 |
| 2012/0099562 A1* | 4/2012 | Smadi | H04W 36/08 |
| | | | 370/332 |
| 2012/0263155 A1* | 10/2012 | Kholaif | H04W 48/16 |
| | | | 370/338 |
| 2012/0264426 A1* | 10/2012 | Kholaif | H04W 48/16 |
| | | | 455/434 |
| 2013/0010764 A1* | 1/2013 | Tseng | H04W 48/18 |
| | | | 370/335 |
| 2013/0010773 A1* | 1/2013 | Hong | H04W 88/10 |
| | | | 370/338 |
| 2013/0235814 A1* | 9/2013 | Wietfeldt | H04W 72/1231 |
| | | | 370/329 |
| 2014/0226628 A1* | 8/2014 | Helbert | H04W 88/06 |
| | | | 370/331 |
| 2014/0349584 A1* | 11/2014 | Clevorn | H04B 7/0486 |
| | | | 455/67.13 |
| 2015/0289136 A1* | 10/2015 | Hata | H04L 67/02 |
| | | | 726/7 |
| 2016/0066247 A1 | 3/2016 | Villasenor | |
| 2016/0081597 A1* | 3/2016 | Bhavaraju | A61B 5/7221 |
| | | | 600/365 |
| 2017/0180933 A1* | 6/2017 | Steiner | H04W 4/023 |
| 2018/0063298 A1* | 3/2018 | Fujii | H04L 69/24 |
| 2019/0098566 A1* | 3/2019 | Li | H04W 88/06 |
| 2020/0314739 A1* | 10/2020 | Li | H04W 88/06 |
| 2021/0058826 A1* | 2/2021 | Mao | H04W 28/0804 |

FOREIGN PATENT DOCUMENTS

| | | |
|---|---|---|
| CN | 104717684 | 6/2015 |
| CN | 105592491 | 5/2016 |
| CN | 105592504 | 5/2016 |
| CN | 106572510 | 4/2017 |
| CN | 106851683 | 6/2017 |
| CN | 109743712 | 5/2019 |
| CN | 109743783 | 5/2019 |
| EP | 3439357 | 2/2019 |
| WO | 2017201983 | 11/2017 |

OTHER PUBLICATIONS

EPO, Office Action for EP Application No. 20156784.9, dated Mar. 25, 2020.
SIPO, First Office Action for CN Application No. 201910111690.0, dated Mar. 5, 2020.
WIPO, English translation of the ISR and WO for PCT/CN2020/074899, May 6, 2020.
SIPO, Decision of Rejection for CN Application No. 201910111690.0, Oct. 14, 2020.
IPI, Office Action for IN Application No. 202014006160, dated May 10, 2021.

* cited by examiner

THE ELECTRONIC DEVICE PERFORMS DATA TRANSMISSION WITH THE AT LEAST ONE TERMINAL OVER THE FIRST WI-FI LINK AND THE AT LEAST ONE SECOND WI-FI LINK SIMULTANEOUSLY — 201

METHOD FOR DATA TRANSMISSION AND RELATED PRODUCTS

CROSS-REFERENCE TO RELATED APPLICATION

This application claims priority to Chinese Patent Application No. 201910111690.0, filed on Feb. 12, 2019, the entire disclosure of which is incorporated herein by reference.

TECHNICAL FIELD

This application relates to the technical technology of electronic communication, and particularly to a method for data transmission and related products.

BACKGROUND

At present, electronic devices in the market support data transmission through a cellular network module, and data transmission through a local area network communication module, such as a wireless-fidelity (Wi-Fi) module and a Bluetooth module. For example, if a Bluetooth function of a mobile phone is enabled by a user, the mobile phone will switch from a cellular network operating mode to a Bluetooth access mode and scan a device that can be paired for pairing and connection.

SUMMARY

Implementations of the application provide a method for data transmission and related products, to expand function of the data transmission of electronic device.

According to a first aspect, implementations of the application provide a method for data transmission. The method is applicable to an electronic device. A first wireless-fidelity (Wi-Fi) link and at least one second Wi-Fi link are established between the electronic device and at least one terminal. The first Wi-Fi link is operable in a station mode and each second Wi-Fi link is operable in a soft AP mode. The method includes the following.

Data transmission is performed with the at least one terminal over the first Wi-Fi link and the at least one second Wi-Fi link simultaneously, where a transmission frequency band for data transmission over the first Wi-Fi link is different from a transmission frequency band for data transmission over each of any two links of the at least one second Wi-Fi link.

According to a second aspect, implementations of the application provide an electronic device. The electronic device includes a communication controller, at least one processor, and a computer readable storage coupled to the at least one processor and storing at least one computer executable instruction thereon. The communication controller is configured to establish a first Wi-Fi link and at least one second Wi-Fi link between the electronic device and at least one terminal, where the first Wi-Fi link is operable in a station mode and each second Wi-Fi link is operable in a soft AP mode. The at least one computer executable instruction, when executed by the at least one processor, causes the at least one processor to execute the method of the first aspect.

According to a third aspect, implementations of the application provide a non-transitory computer readable storage medium. The non-transitory computer readable storage medium is configured to store a computer program which, when executed by a processor, causes the processor to execute the method of the first aspect.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic device involved in the implementations of the present disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like.

The following will describe the implementations in detail.

The following elaborates the above process in combination with some typical application scenarios.

Figures 1, 2:
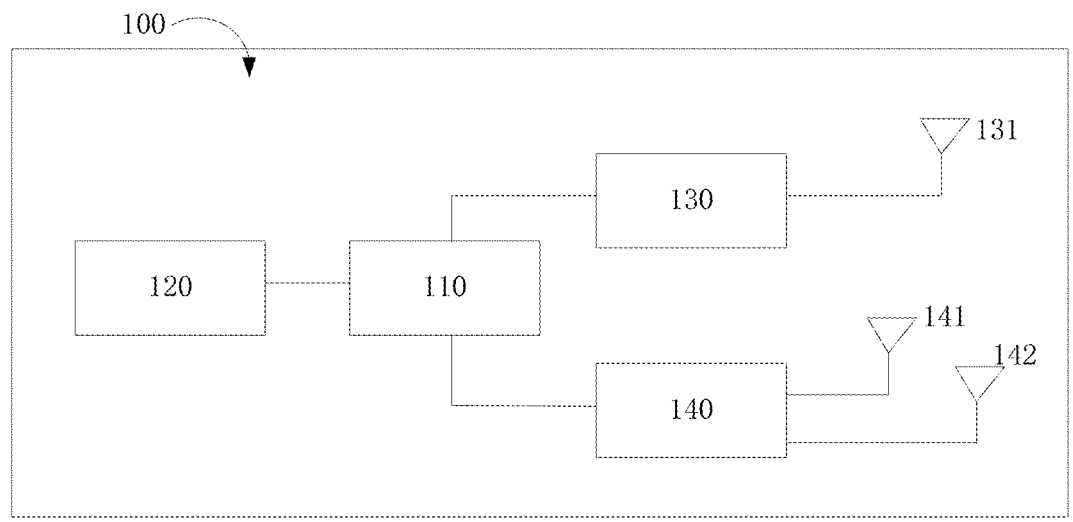
FIG. 1 is a schematic structural diagram illustrating an electronic device according to implementations.
FIG. 2 is a schematic flow chart illustrating a method for data transmission according to implementations.

FIG. 1 is a schematic structural diagram illustrating an electronic device 100 according to implementations. The electronic device 100 includes a processor 110, a baseband modem 120 (also known as baseband chip), a cellular module 130, a cellular antenna 131, a wireless-fidelity (Wi-Fi) module 140, a first Wi-Fi antenna 141, and a second Wi-Fi antenna 142. The processor 110 is coupled with the baseband modem 120. The baseband modem 120 is coupled with the cellular module 130 and the Wi-Fi module 140. The cellular module 130 is coupled with the cellular antenna 131. The Wi-Fi module 140 is coupled with the first Wi-Fi antenna 141 and the second Wi-Fi antenna 142. A single Wi-Fi operating mode includes a station mode, hotspot soft access point (AP) mode (shortened as soft AP mode), or peer-to-peer (P2P) mode. The station mode refers to a mode where the electronic device serves as a client, which can access to an AP. The soft AP mode refers to a mode where the electronic device serves as an AP, which allows other clients to access to. The P2P mode refers to a mode where each party has the same capabilities and either party can initiate a communication session. A dual Wi-Fi operating mode includes any of: station mode+station mode, station mode+soft AP mode, soft AP mode+P2P mode, soft AP mode+soft AP mode, soft AP mode+P2P mode, and P2P mode+P2P mode. The electronic device 100 of the implementation can switch between the single Wi-Fi operating mode and the dual Wi-Fi operating mode, where the dual Wi-Fi operating mode is station mode+soft AP mode. Since the Wi-Fi module is coupled with the first Wi-Fi antenna 141 and the second Wi-Fi antenna 142, from a hardware perspective, data transmission over two Wi-Fi links can be achieved, that is, data is transmitted through the first Wi-Fi antenna 141 and the second Wi-Fi antenna 142 respectively at the same time.

FIG. 2 is a schematic flow chart illustrating a method for data transmission according to implementations. The method is applicable to the electronic device of FIG. 1. A first Wi-Fi link and at least one second Wi-Fi link are established between the electronic device and at least one terminal. The first Wi-Fi link is operable in a station mode and each second Wi-Fi link is operable in a soft AP mode. The electronic device can enable both the station mode and the soft AP mode. The method begins at 201.

At 201, the electronic device performs data transmission with the at least one terminal over the first Wi-Fi link and the at least one second Wi-Fi link simultaneously, where a transmission frequency band for data transmission over the first Wi-Fi link is different from a transmission frequency band for data transmission over each of any two links of the at least one second Wi-Fi link.

That is, the station mode of the electronic device allows data transmission over the first Wi-Fi link and the soft AP mode of the electronic device allows data transmission over the second Wi-Fi link.

The first Wi-Fi link and the second Wi-Fi link may be configured in a 2.4G Wi-Fi frequency band and a 5G Wi-Fi frequency band, respectively.

In terms of encryption manners, transmission rates, attenuation speeds, and anti-interference capabilities, the capability of the first Wi-Fi link is different from that of the second Wi-Fi link. The electronic device may classify data to-be-transmitted according to the above differences, so as to transmit data adapted to different Wi-Fi links, thereby implementing offloading transmission of the data to-be-transmitted.

According to the implementations, the first Wi-Fi link and the at least one second Wi-Fi link are established between the electronic device and the at least one terminal. The first Wi-Fi link is operable in the station mode and each second Wi-Fi link is operable in the soft AP mode. The electronic device performs the data transmission with the at least one terminal over the first Wi-Fi link and the at least one second Wi-Fi link simultaneously, where the transmission frequency band for data transmission over the first Wi-Fi link is different from the transmission frequency band for data transmission over each of any two links of the at least one second Wi-Fi link. In this way, the electronic device can enable both the station mode and the soft AP mode to perform wireless connection and the data transmission with the at least one terminal. Compared with a single-channel data transmission mode where data is transmitted over a single channel, the multiple-channel data transmission mode can improve efficiency and flexibility of the data transmission of the electronic device and expand capability of the data transmission of electronic device.

In at least one implementation, the at least one terminal is a target terminal, the at least one second Wi-Fi link is a second Wi-Fi link, and the first Wi-Fi link and the second Wi-Fi link are established between the electronic device and the target terminal. The electronic device performs the data transmission with the at least one terminal over the first Wi-Fi link and the at least one second Wi-Fi link simultaneously as follows. The electronic device transmits (in other words, communicate) first data with the target terminal over the first Wi-Fi link. The electronic device transmits second data with the target terminal over the second Wi-Fi link.

For an example, a Wi-Fi module of the target terminal supports soft AP mode+station mode. In this case, the first Wi-Fi link is established between the electronic device in the station mode and the target terminal in the soft AP mode, and the second Wi-Fi link is established between the electronic device in the soft AP mode and the target terminal in the station mode. If the electronic device enables a hotspot AP1 and the target terminal enables a hotspot AP2, then a transmission link where the electronic device accesses AP2 is the first Wi-Fi link, and a transmission link where the target terminal accesses AP1 is the second Wi-Fi link.

The electronic device can transmit data of the same type over the first Wi-Fi link and the second Wi-Fi link, such as transmit video data, picture data, text data, etc. The data of the same type can be from the same application or different applications, which is not limited herein.

Alternatively, the electronic device can transmit data of a first type over the first Wi-Fi link and data of a second type over the second Wi-Fi link. The data of the first type or the data of the second type includes audio, video, picture, text, etc. The data of the first type and the data of the second type can be from the same application or different applications, which is not limited herein.

According to the implementations, the first Wi-Fi link and the second Wi-Fi link are established between the electronic device and the target terminal at the same time, such that dual-channel data transmission can be achieved between the electronic device and the target terminal, improving flexibility and efficiency of the data transmission of the electronic device.

In at least one implementation, the at least one terminal includes a first terminal and at least one second terminal, and the first Wi-Fi link is established between the electronic device and the first terminal and a second Wi-Fi link is established between the electronic device and each second terminal. The electronic device performs the data transmission with the at least one terminal over the first Wi-Fi link and the at least one second Wi-Fi link simultaneously as follows. The electronic device transmits first data with the first terminal over the first Wi-Fi link. For each second terminal, the electronic device transmits second data with the second terminal over the second Wi-Fi link corresponding to the second terminal.

Each of the at least one second terminal is connected to a hotspot AP enabled by the electronic device. The at least one second terminal can include one second terminal or multiple second terminals, and the number of second terminals that are allowed to access to the hotspot AP can be restricted by the electronic device according to a preset strategy. The preset strategy include the following.

First strategy. The number is restricted based on device identity or user identity, such as a preset whitelist is provided, and only terminals in the whitelist are allowed to access to the hotspot AP.

Second strategy. The number is restricted based on a password-based login authentication mechanism, that is, password authentication is required for access, and only terminals with successful authentication are allowed to access to the hotspot AP.

Third strategy. The number is restricted based on user selection. Terminals that are about to apply for access are displayed in a list for the user of the electronic device to select, and a terminal(s) selected is allowed to access to the hotspot AP.

Fourth strategy. The number is dynamically determined based on status of a system of the electronic device (local device), for example, based on access time and number, such as dynamically determining the number based on current power status of the local device.

The types of the first data and the second data are not limited.

Applicable scenario. The electronic device acts as a relay device. In this case, a Wi-Fi channel, supporting the station mode, for the electronic device accesses a hotspot that can provide Internet services, providing free network services, and a Wi-Fi channel, supporting the soft AP mode, for the electronic device allows one or more devices to-be-connected-to-the-Internet to access, so that the one or more devices to-be-connected-to-the-Internet can perform network data interaction through the electronic device. Since the electronic device has only one cellular module, for network access requests of multiple devices to-be-connected-to-the-Internet, time division multiplexing is required and a queuing mechanism is adopted, to improve stability.

According to the implementations, the electronic device can respectively access different terminals through two Wi-Fi channels supporting different modes, thereby achieving data interaction with multiple devices and improving comprehensiveness and applicability of data transmission of the electronic device.

In at least one implementation, the electronic device transmits the first data with the first terminal over the first Wi-Fi link as follows. The electronic device transmits at least one of local data of the electronic device and local data of the first terminal with the first terminal over the first Wi-Fi link. The electronic device transmits the second data with the second terminal over the second Wi-Fi link corresponding to the second terminal as follows. The electronic device transmits at least one of the local data of the electronic device and local data of the second terminal with the second terminal over the second Wi-Fi link corresponding to the second terminal.

The electronic device only supports transmitting local area network (LAN) data via simultaneous use of the first Wi-Fi link and the at least one second Wi-Fi link.

According to the implementations, when the Wi-Fi module of the electronic device in the station mode+soft AP mode supports only a LAN function, the LAN data can be transmitted synchronously, improving the flexibility and efficiency of transmission of the LAN data of the electronic device.

In at least one implementation, the electronic device transmits the first data with the first terminal over the first Wi-Fi link as follows. The electronic device transmits data from a first network side and at least one of local data of the electronic device, local data of the first terminal, and data from a second network side with the first terminal over the first Wi-Fi link. The electronic device transmits the second data with the second terminal over the second Wi-Fi link corresponding to the second terminal as follows. The electronic device transmits at least one of the local data of the electronic device, local data of the second terminal, and data from a third network side with the second terminal over the second Wi-Fi link corresponding to the second terminal.

The electronic device supports sharing a mobile network via simultaneous use of the first Wi-Fi link or the at least one second Wi-Fi link.

According to the implementations, when the Wi-Fi module of the electronic device in the station mode+soft AP mode supports only a network sharing function of a single Wi-Fi channel, LAN data and cellular data can be transmitted synchronously, improving the comprehensiveness and flexibility of network data transmission of electronic device.

In at least one implementation, the electronic device transmits the first data with the first terminal over the first Wi-Fi link as follows. The electronic device transmits data from a first network side and at least one of local data of the electronic device, local data of the first terminal, and data from a second network side with the first terminal over the first Wi-Fi link. The electronic device transmits the second data with the second terminal over the second Wi-Fi link as follows corresponding to the second terminal. The electronic device transmits the data from the first network side and at least one of the local data of the electronic device, local data of the second terminal, and data from a third network side with the second terminal over the second Wi-Fi link corresponding to the second terminal.

The electronic device supports sharing a mobile network via simultaneous use of the first Wi-Fi link and the at least one second Wi-Fi link.

The electronic device can use the cellular module of the electronic device according to mechanisms such as time division multiplexing to implement network data access requests for different devices.

According to the implementations, when the Wi-Fi module of the electronic device in the station mode+soft AP mode supports a network sharing function of two Wi-Fi channels, the network data access requests for different devices can be implemented according to the mechanisms such as time division multiplexing, improving intelligence and flexibility of network data transmission of the electronic device.

In at least one implementation, before transmitting the first data with the first terminal over the first Wi-Fi link, the electronic device determines that the first Wi-Fi link is used for transmitting the first data, and determines that each second Wi-Fi link is used for transmitting the second data.

Various strategies can be used for the electronic device to offload data to-be-transmitted to the first Wi-Fi link and the second Wi-Fi link, which is not limited herein. For example, the strategy can be determined comprehensively according to link capability of each Wi-Fi link and data characteristics of the data to-be-transmitted.

According to the implementations, the electronic device can configure the data to-be-transmitted, to realize the offloading transmission and improve the efficiency of data transmission.

In at least one implementation, the following is further conducted. The electronic device enables a dual Wi-Fi operating mode of the electronic device. The electronic device establishes the first Wi-Fi link with the first terminal. The electronic device establishes the at least one second Wi-Fi link with the at least one second terminal.

For example, for protocols used in establishing the first Wi-Fi link and the second Wi-Fi link by the electronic device, reference can be made to related Wi-Fi protocol mechanisms, which will not be repeated herein. In addition, the electronic device can enable the dual Wi-Fi operating mode under different trigger condition and in various manners, and which is not limited herein.

In an example, the electronic device (local device) can provide a function button dedicated for enabling the dual Wi-Fi operating mode. When the electronic device detects that the function button is clicked by a user, the dual Wi-Fi operating mode is enabled.

In another example, the electronic device can determine whether to enable the dual Wi-Fi operating mode based on scenes. When the electronic device identifies that the current scene is in a preset scene requiring the dual Wi-Fi operating mode to be enabled, the local device automatically enables the dual Wi-Fi operating mode.

In still another example, the electronic device can determine whether to enable the dual Wi-Fi operating mode based on an enabling request of a peer device, and enable the dual Wi-Fi operating mode after deciding to respond to the enabling request.

According to the implementations, the electronic device can flexibly enable the dual Wi-Fi operating mode and establish the first Wi-Fi link and the second Wi-Fi link, to achieve multi-link data transmission and improve the efficiency and flexibility of data transmission.

In at least one implementation, a function achieved by the electronic device over the first Wi-Fi link and the at least one second Wi-Fi link includes at least one of: mobile phone transfer, file transfer, game, network sharing, and one-way control function for the at least one terminal.

The following elaborates the above process in combination with some typical application scenarios.

Scenario 1: mobile phone transfer. In scenario 1, the electronic device is an old mobile phone of a user and the target terminal is a new mobile phone of the user. The user selects a mobile phone transfer function of the old mobile phone (local device) and selects the option "I am the old mobile phone". The old mobile phone then enables a dual Wi-Fi connection function of a Wi-Fi module, and the local device creates a first hotspot AP1, searches for a hotspot that can access to, and prompts the user to enable the mobile phone transfer function of the new mobile phone. The user enables a mobile phone transfer function of the new mobile phone and selects the option "I am a new mobile phone". The new mobile phone then enables a dual Wi-Fi connection function of a Wi-Fi module, enables a second hotspot AP2, and searches for a hotspot that can access to. The old mobile phone searches for AP2 and requests access, and the new mobile phone searches for AP1 and requests access. Both the old mobile phone and the new mobile phone are allowed to access after verifying their identities. In such case, the old mobile phone can divide data of the local device into a first part and a second part according to a preset offloading strategy, and transmit the first part of the data over the first Wi-Fi link and the second part of the data over the second Wi-Fi link. The specific form of the preset offloading strategy may be various, such as dividing according to data type, dividing according to storage address, dividing according to storage time, dividing according to user setting, etc., which are not limited here.

Scenario 2: smart home. In scenario 2, the electronic device is a mobile phone of a user, the first terminal is a smart TV (currently accessing to a second hotspot AP2 and used to interconnect with the mobile phone to implement functions such as video on demand) in the living room, and the second terminal is a laptop (used to receive working materials such as conference recordings stored in mobile phone) of the user. The mobile phone is equipped with a dual Wi-Fi function button. When the user arrives at home, he/she can click the function button to enable a dual Wi-Fi function of a Wi-Fi module. The mobile phone creates a first hotspot AP1 and scans the second hotspot AP2 (the second hotspot is a hotspot of the smart home). The mobile phone accesses to AP2 and establishes a first Wi-Fi link with the smart TV to achieve interconnection. The user can operate the laptop to access AP1 to establish a second Wi-Fi link with the mobile phone at the same time. The user can send the pre-downloaded movie (of the mobile phone) to the smart TV over the first Wi-Fi link, while operate the laptop to download files like today's conference videos, recordings over the second Wi-Fi link.

Scenario 3: single-link network sharing. In scenario 3, the electronic device is a mobile phone of a parent, the first terminal is a smart speaker (accessing to a second wireless hotspot AP2 of the home), and the second terminal is a tablet computer for children. The parent can set the mobile phone of the parent to enable a Wi-Fi connection function of a Wi-Fi module. The mobile phone of the parent enables a first hotspot AP1, and allows the tablet computer to access to establish a second Wi-Fi link with the tablet computer. The mobile phone of the parent at the same time can access AP2 and establish a first Wi-Fi link with the smart speaker. Furthermore, the parent can set only the first Wi-Fi link to support a network sharing function and set an Internet access restriction strategy of the second Wi-Fi link, through the mobile phone of the parent. Therefore, on the one hand, children can watch online cartoons, etc., and on the other hand, children's online environment can be safe and pure. At the same time, the mobile phone of the parent can send network data to the smart speaker over the first Wi-Fi link.

Scenario 4: dual-link network sharing. In scenario 4, the electronic device is a primary mobile phone installed with a local phone card, the first terminal is a vehicle-mounted device, where the vehicle-mounted device (such as a car music service) has been connected to a car hotspot (called AP2), and the second terminal is a secondary mobile phone. When a user drives to certain areas (such as renting a car abroad and the car hotspot has not renewed network tariffs), the user can enable a dual Wi-Fi function of the primary mobile phone. The primary mobile phone creates a first hotspot AP1, scans to AP2, accesses AP2, and establishes a first Wi-Fi link with the vehicle-mounted device to achieve interconnection. The secondary mobile phone scans to AP1, accesses AP1, and establishes a second Wi-Fi link with the primary mobile phone to achieve interconnection. Therefore, both the vehicle-mounted device and the secondary mobile phone can achieve network interconnection through the primary mobile phone. The primary mobile phone supports a conflict handling mechanism for multiple Internet access requests at a same time period. The conflict handling mechanism can have various strategies, such as sorting based on initiators of the multiple Internet access requests, or sorting based on service types associated with the multiple Internet access requests, etc., which is not limited here.

Figure 3:
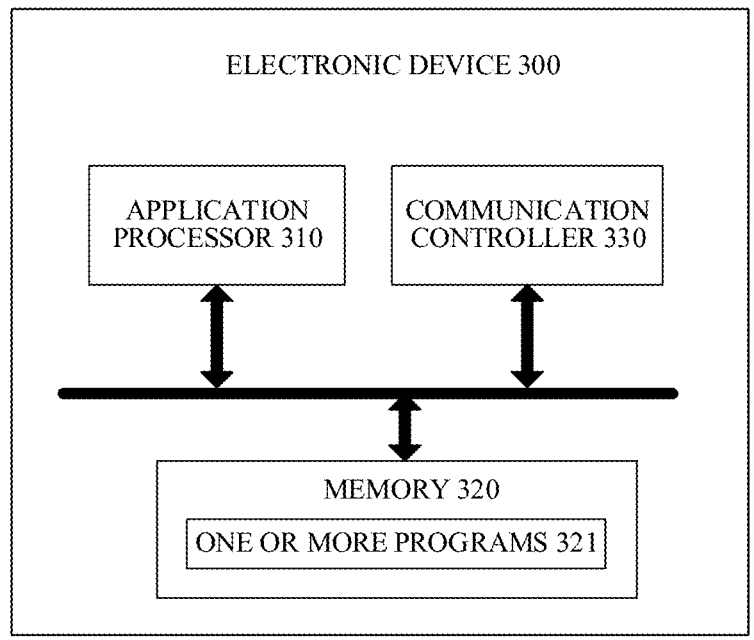
FIG. 3 is a schematic structural diagram illustrating an electronic device according to implementations.

In accordance with the implementations of FIG. 2, FIG. 3 is a schematic structural diagram illustrating an electronic device 300 according to implementations. As illustrated in FIG. 3, the electronic device 300 includes at least one processor (such as an application processor 310), a computer readable storage (such as a memory 320) configured to store at least one computer executable instruction (such as one or more programs 321), and a communication controller 330. The communication controller 330 is configured to establish a first Wi-Fi link and at least one second Wi-Fi link between the electronic device and at least one terminal, where the first Wi-Fi link is operable in a station mode and each second Wi-Fi link is operable in a soft AP mode. The one or more programs 321 are configured to be executed by the application processor 310 and include instructions configured to perform the following.

Data transmission is performed with the at least one terminal over the first Wi-Fi link and the at least one second Wi-Fi link simultaneously, where a transmission frequency band for data transmission over the first Wi-Fi link is different from a transmission frequency band for data transmission over each of any two links of the at least one second Wi-Fi link.

According to the implementations, the first Wi-Fi link and the at least one second Wi-Fi link are established between the electronic device and the at least one terminal. The first Wi-Fi link supports the station mode and each second Wi-Fi link supports the soft AP mode. The electronic device performs the data transmission with the at least one terminal over the first Wi-Fi link and the at least one second Wi-Fi link simultaneously, where the transmission frequency band for data transmission over the first Wi-Fi link is different from the transmission frequency band for data transmission over each of any two links of the at least one second Wi-Fi link. In this way, the electronic device can enable both the station mode and the soft AP mode to perform wireless connection and the data transmission with the at least one terminal. Compared with a single-channel data transmission mode, the multiple-channel data transmission mode can improve efficiency and flexibility of the data transmission of the electronic device and expand capability of the data transmission of electronic device.

In at least one implementation, the at least one terminal refers to a target terminal, the at least one second Wi-Fi link refers to a second Wi-Fi link, and the first Wi-Fi link and the second Wi-Fi link are established between the electronic device and the target terminal. In terms of performing the data transmission with the at least one terminal via simultaneous use of the first Wi-Fi link and the at least one second Wi-Fi link, the instructions of the one or more programs 321 are configured to perform the following. Transmit first data with the target terminal over the first Wi-Fi link. Transmit second data with the target terminal over the second Wi-Fi link.

In at least one implementation, the at least one terminal includes a first terminal and at least one second terminal, and the first Wi-Fi link is established between the electronic device and the first terminal and a second Wi-Fi link is established between the electronic device and each second terminal. In terms of performing the data transmission with the at least one terminal via simultaneous use of the first Wi-Fi link and the at least one second Wi-Fi link, the instructions of the one or more programs 321 are configured to perform the following. Transmit first data with the first terminal over the first Wi-Fi link. For each second terminal, transmit second data with the second terminal over the second Wi-Fi link corresponding to the second terminal.

In at least one implementation, in terms of transmitting the first data with the first terminal over the first Wi-Fi link, the instructions of the one or more programs 321 are configured to perform the following. Transmit at least one of local data of the electronic device and local data of the first terminal with the first terminal over the first Wi-Fi link. In terms of transmitting the second data with the second terminal over the second Wi-Fi link corresponding to the second terminal, the instructions of the one or more programs 321 are configured to perform the following. Transmit at least one of the local data of the electronic device and local data of the second terminal with the second terminal over the second Wi-Fi link corresponding to the second terminal.

In at least one implementation, in terms of transmitting the first data with the first terminal over the first Wi-Fi link, the instructions of the one or more programs 321 are configured to perform the following. Transmit data from a first network side and at least one of local data of the electronic device, local data of the first terminal, and data from a second network side with the first terminal over the first Wi-Fi link. In terms of transmitting the second data with the second terminal over the second Wi-Fi link corresponding to the second terminal, the instructions of the one or more programs 321 are configured to perform the following. Transmit at least one of the local data of the electronic device, local data of the second terminal, and data from a third network side with the second terminal over the second Wi-Fi link corresponding to the second terminal.

In at least one implementation, in terms of transmitting the first data with the first terminal over the first Wi-Fi link, the instructions of the one or more programs 321 are configured to perform the following. Transmit data from a first network side and at least one of local data of the electronic device, local data of the first terminal, and data from a second network side with the first terminal over the first Wi-Fi link. In terms of transmitting the second data with the second terminal over the second Wi-Fi link corresponding to the second terminal, the instructions of the one or more programs 321 are configured to perform the following. Transmit the data from the first network side and at least one of the local data of the electronic device, local data of the second terminal, and data from a third network side with the second terminal over the second Wi-Fi link corresponding to the second terminal.

In at least one implementation, the one or more programs 321 further include instructions configured to perform the following before transmitting the first data with the first terminal over the first Wi-Fi link. Determine that the first Wi-Fi link is used for transmitting the first data. Determine that each second Wi-Fi link is used for transmitting the second data.

In at least one implementation, the one or more programs 321 further include instructions configured to perform the following. A dual Wi-Fi operating mode of the electronic device is enabled. The first Wi-Fi link is established with the first terminal. The at least one second Wi-Fi link is established with the at least one second terminal.

In at least one implementation, a function achieved by the electronic device over the first Wi-Fi link and the at least one second Wi-Fi link includes at least one of: mobile phone transfer, file transfer, game, network sharing, and one-way control function for the at least one terminal.

The foregoing solution of the implementations of the disclosure is mainly described from the viewpoint of execution process of the method. It can be understood that, in order to implement the above functions, the mobile terminal includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the mobile terminal in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

Figure 4:
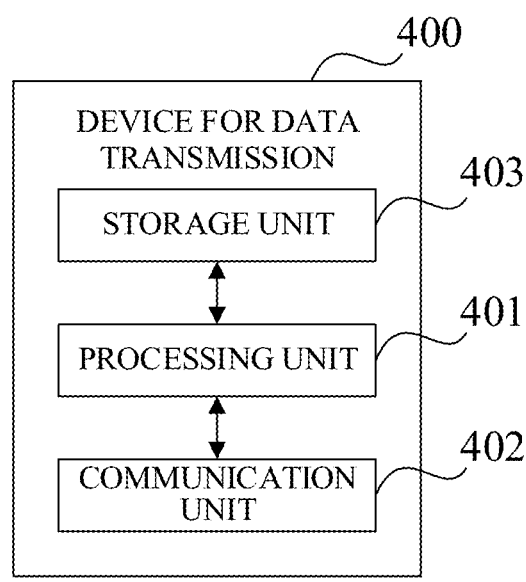
FIG. 4 is a block diagram illustrating functional units of a device for data transmission according to implementations.

FIG. 4 is a block diagram illustrating functional units of a device 400 for data transmission according to implementations. The device 400 for data transmission is applicable to an electronic device. A first Wi-Fi link and at least one second Wi-Fi link are simultaneously established between the electronic device and at least one terminal. The first Wi-Fi link is operable in a station mode and each second Wi-Fi link is operable in a soft AP mode. The device 400 for data transmission includes a processing unit 401 and a communication unit 402. The communication unit 402 can be implemented as a communication controller or other components having communication control function such as a communication logic control circuit and the like. The communication unit 402 for example includes a Wi-Fi module configured to establish the first Wi-Fi link and the at least one second Wi-Fi link.

The processing unit 401 is configured to perform, through the communication unit, data transmission with the at least one terminal over the first Wi-Fi link and the at least one second Wi-Fi link, where a transmission frequency band for data transmission over the first Wi-Fi link is different from a transmission frequency band for data transmission over each of any two links of the at least one second Wi-Fi link.

The processing unit 401 can be an application processor or a baseband chip, or a system-on-chip (SoC). The device 400 for data transmission further includes a storage unit 403. The storage unit 403 can be a memory.

According to the implementations, the first Wi-Fi link and the at least one second Wi-Fi link are established between the electronic device and the at least one terminal. The first Wi-Fi link is operable in the station mode and each second Wi-Fi link is operable in the soft AP mode. The electronic device performs the data transmission with the at least one terminal over the first Wi-Fi link and the at least one second Wi-Fi link, where the transmission frequency band of the first Wi-Fi link is different from and has no interference with that of any two links of the at least one second Wi-Fi link. In this way, the electronic device can enable both the station mode and the soft AP mode to perform wireless connection and the data transmission with the at least one terminal. Compared with a single-channel data transmission mode, the multiple-channel data transmission mode can improve efficiency and flexibility of the data transmission of the electronic device and expand capability of the data transmission of electronic device.

In at least one implementation, the at least one terminal is embodied as a target terminal, the at least one second Wi-Fi link is embodied as one second Wi-Fi link, and the first Wi-Fi link and the one second Wi-Fi link are established between the electronic device and the target terminal. In terms of performing the data transmission with the at least one terminal over the first Wi-Fi link and the at least one second Wi-Fi link, the processing unit 401 is configured to transmit first data with the target terminal over the first Wi-Fi link, and transmit second data with the target terminal over the one second Wi-Fi link.

In at least one implementation, the at least one terminal includes a first terminal and at least one second terminal, and the first Wi-Fi link is established between the electronic device and the first terminal and one second Wi-Fi link is established between the electronic device and each second terminal. In terms of performing the data transmission with the at least one terminal over the first Wi-Fi link and the at least one second Wi-Fi link, the processing unit 401 is configured to transmit first data with the first terminal over the first Wi-Fi link, and for each second terminal, transmit second data with the second terminal over the second Wi-Fi link corresponding to the second terminal.

In at least one implementation, in terms of transmitting the first data with the first terminal over the first Wi-Fi link, the processing unit 401 is configured to transmit at least one of local data of the electronic device and local data of the first terminal with the first terminal over the first Wi-Fi link. In terms of transmitting the second data with the second terminal over the second Wi-Fi link corresponding to the second terminal, the processing unit 401 is configured to transmit at least one of the local data of the electronic device and local data of the second terminal with the second terminal over the second Wi-Fi link corresponding to the second terminal.

In at least one implementation, in terms of transmitting the first data with the first terminal over the first Wi-Fi link, the processing unit 401 is configured to transmit data from a first network side and at least one of local data of the electronic device, local data of the first terminal, and data from a second network side with the first terminal over the first Wi-Fi link. In terms of transmitting the second data with the second terminal over the second Wi-Fi link corresponding to the second terminal, the processing unit 401 is configured to transmit at least one of the local data of the electronic device, local data of the second terminal, and data from a third network side with the second terminal over the second Wi-Fi link corresponding to the second terminal.

In at least one implementation, in terms of transmitting the first data with the first terminal over the first Wi-Fi link, the processing unit 401 is configured to transmit data from a first network side and at least one of local data of the electronic device, local data of the first terminal, and data from a second network side with the first terminal over the first Wi-Fi link. In terms of transmitting the second data with the second terminal over the second Wi-Fi link corresponding to the second terminal, the processing unit 401 is configured to transmit the data from the first network side and at least one of the local data of the electronic device, local data of the second terminal, and data from a third network side with the second terminal over the second Wi-Fi link corresponding to the second terminal.

In at least one implementation, the processing unit 401 is further configured to: determine that the first Wi-Fi link is used for transmitting the first data, and determine that each second Wi-Fi link is used for transmitting the second data, before transmitting the first data with the first terminal over the first Wi-Fi link.

In at least one implementation, the processing unit 401 is further configured to: enable a dual Wi-Fi operating mode of the electronic device, establish the first Wi-Fi link with the first terminal, and establish the at least one second Wi-Fi link with the at least one second terminal.

In at least one implementation, a function achieved by the electronic device over the first Wi-Fi link and the at least one second Wi-Fi link includes at least one of: mobile phone transfer, file transfer, game, network sharing, and one-way control function for the at least one terminal.

Implementations of the application further provide a non-transitory computer readable storage medium. The non-transitory computer readable storage medium is configured to store a computer program which, when executed by a processor, causes the processor to execute the method of any of the above implementations.

Implementations of the application further provide a computer program product. The computer program product includes a non-transitory computer readable storage medium that stores computer programs. The computer programs are operable with a computer to perform all or part of the operations of any method of the method implementations. The computer program product may be a software installation package. The computer includes an electronic device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable memory, which may include a flash memory, a read-only memory (ROM), a random-access memory (RAM), Disk or compact disc (CD), and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for data transmission for an electronic device, wherein a first wireless-fidelity (Wi-Fi) link and at least one second Wi-Fi link are established between the electronic device and at least one terminal, and wherein the first Wi-Fi link is operable in a station mode and each second Wi-Fi link is operable in a soft AP mode, the method comprising:
   performing data transmission with the at least one terminal over the first Wi-Fi link and the at least one second Wi-Fi link simultaneously, wherein a transmission frequency band for data transmission over the first Wi-Fi link is different from a transmission frequency band for data transmission over each of any two links of the at least one second Wi-Fi link;
   wherein the at least one terminal comprises a first terminal and at least one second terminal, and the first Wi-Fi link is established between the electronic device and the first terminal and a second Wi-Fi link is established between the electronic device and each second terminal; and wherein performing the data transmission with the at least one terminal over the first Wi-Fi link and the at least one second Wi-Fi link simultaneously comprises:
  transmitting first data with the first terminal over the first Wi-Fi link, wherein the first data comprises data from a first network side and at least one of local data of the electronic device, local data of the first terminal, and data from a second network side; and
  for each second terminal, transmitting second data with the second terminal over the second Wi-Fi link corresponding to the second terminal, wherein the second data comprises at least one of the local data of the electronic device, local data of the second terminal, and data from a third network side.

2. The method of claim 1, further comprising:
before transmitting the first data with the first terminal over the first Wi-Fi link, determining that the first Wi-Fi link is used for transmitting the first data; and
determining that each second Wi-Fi link is used for transmitting the second data.

3. The method of claim 1, further comprising:
enabling a dual Wi-Fi operating mode of the electronic device;
establishing the first Wi-Fi link with the first terminal; and
establishing the at least one second Wi-Fi link with the at least one second terminal.

4. A non-transitory computer readable storage medium storing a computer program which, when executed by a processor, causes the processor to perform the method of claim 1.

5. An electronic device, comprising a communication controller, at least one processor, and a computer readable storage coupled to the at least one processor and storing at least one computer executable instruction thereon, wherein:
  the communication controller is configured to establish a first wireless-fidelity (Wi-Fi) link and at least one second Wi-Fi link between the electronic device and at least one terminal, wherein the first Wi-Fi link is operable in a station mode and each second Wi-Fi link is operable in a soft AP mode; and
  the at least one computer executable instruction, when executed by the at least one processor, causes the at least one processor to:
  perform data transmission with the at least one terminal over the first Wi-Fi link and the at least one second Wi-Fi link simultaneously, wherein a transmission frequency band for data transmission over the first Wi-Fi link is different from a transmission frequency band for data transmission over each of any two links of the at least one second Wi-Fi link;
  wherein the at least one terminal comprises a first terminal and at least one second terminal, and the first Wi-Fi link is established between the electronic device and the first terminal and a second Wi-Fi link is established between the electronic device and each second terminal; and
  wherein the at least one computer executable instruction, when executed by the at least one processor, causing the at least one processor to perform the data transmission with the at least one terminal over the first Wi-Fi link and the at least one second Wi-Fi link simultaneously causes the at least one processor to:
    transmit first data with the first terminal over the first Wi-Fi link, wherein the first data comprises data from a first network side and at least one of local data of the electronic device, local data of the first terminal, and data from a second network side; and
    for each second terminal, transmit second data with the second terminal over the second Wi-Fi link corresponding to the second terminal, wherein the second data comprises at least one of the local data of the electronic device, local data of the second terminal, and data from a third network side.

6. The electronic device of claim 5, wherein the at least one processor is further configured to:
determine that the first Wi-Fi link is used for transmitting the first data; and
determine that each second Wi-Fi link is used for transmitting the second data.

7. The electronic device of claim 5, wherein the at least one processor is further configured to:
enable a dual Wi-Fi operating mode of the electronic device;
establish the first Wi-Fi link with the first terminal; and
establish the at least one second Wi-Fi link with the at least one second terminal.

8. A method for data transmission for an electronic device, wherein a first wireless-fidelity (Wi-Fi) link and at least one second Wi-Fi link are established between the electronic device and at least one terminal, and wherein the first Wi-Fi link is operable in a station mode and each second Wi-Fi link is operable in a soft AP mode, the method comprising:
  performing data transmission with the at least one terminal over the first Wi-Fi link and the at least one second Wi-Fi link simultaneously, wherein a transmission frequency band for data transmission over the first Wi-Fi link is different from a transmission frequency band for data transmission over each of any two links of the at least one second Wi-Fi link;
  wherein the at least one terminal comprises a first terminal and at least one second terminal, and the first Wi-Fi link is established between the electronic device and the first terminal and a second Wi-Fi link is established between the electronic device and each second terminal; and
  wherein performing the data transmission with the at least one terminal over the first Wi-Fi link and the at least one second Wi-Fi link simultaneously comprises:
    transmitting first data with the first terminal over the first Wi-Fi link, wherein the first data comprises data from a first network side and at least one of local data of the electronic device, local data of the first terminal, and data from a second network side; and
    for each second terminal, transmitting second data with the second terminal over the second Wi-Fi link corresponding to the second terminal, wherein the second data comprises the data from the first network side and at least one of the local data of the electronic device, local data of the second terminal, and data from a third network side.

9. The method of claim 8, further comprising:
before transmitting the first data with the first terminal over the first Wi-Fi link, determining that the first Wi-Fi link is used for transmitting the first data; and
determining that each second Wi-Fi link is used for transmitting the second data.

10. The method of claim 8, further comprising:
enabling a dual Wi-Fi operating mode of the electronic device;
establishing the first Wi-Fi link with the first terminal; and
establishing the at least one second Wi-Fi link with the at least one second terminal.

* * * * *